Dec. 24, 1929.   R. SALBADOR   1,740,479
PIPE COUPLING SEAL
Filed March 23, 1928

Inventor
R. Salbador
By Lacey & Lacey, Attorneys

Patented Dec. 24, 1929

1,740,479

UNITED STATES PATENT OFFICE

RAMON SALBADOR, OF NEW ORLEANS, LOUISIANA

PIPE-COUPLING SEAL

Application filed March 23, 1928. Serial No. 264,227.

This invention relates to a protecting seal or casing adapted to be disposed about a coupling which connects a gas meter or the like with a supply pipe leading to the meter and outlet pipe leading therefrom.

At the present time gas meters and the like are provided with inlet and outlet pipes which are connected with nipples leading supply and house pipes through the medium of coupling nuts which are screwed tightly into place. The nuts are unprotected and it has been found that unscrupulous persons will often release the couplings and join the two pipes through the medium of a pipe led around the meter thereby using gas without the gas passing through the meter.

Therefore, one object of the invention is to provide a casing which can be disposed about a coupling and when properly secured prevent the coupling from being tampered with.

Another object of the invention is to so form the casing that, when in place, it will be impossible to release the coupling or successfully unscrew the nipple from a gas pipe.

Another object of the invention is to provide a protecting casing of this character which will be light in weight but strong and durable and very easy to apply.

Another object of the invention is to form the casing of companion sections adapted to be disposed about a coupling and provide improved means to hingedly connect the sections of the casing and also improved means to releasably hold them closed.

The invention is illustrated in the accompanying drawing, wherein

Figure 3:
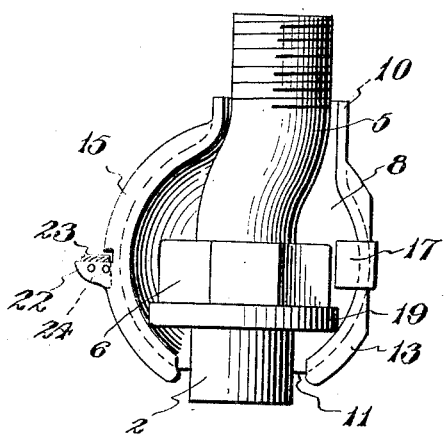
Fig. 3 is a view similar to Fig. 2 showing one section of the casing removed.

The meter, which is indicated in general by the numeral 1, represents a gas meter of a conventional construction and is provided with an inlet pipe or neck 2 and an outlet pipe 3. The gas main 4 and the house pipe 3' each carries a nipple 5 which is screwed into it and each nipple is bent intermediate its length so that its upper and lower ends are out of alinement, as shown in Fig. 3. Each nipple carries a coupling 6 and these couplings are adapted to be screwed upon the pipes 2 and 3 of the meter. Under ordinary conditions, the couplings 6 are exposed and it is very easy to release them from the pipes 2 and 3 and attach them to a short piece of pipe thereby allowing gas to flow from the main 4 to the supply pipe 3 of a house without passing through the meter and thereby defraud the company which is supplying gas.

Figure 1:
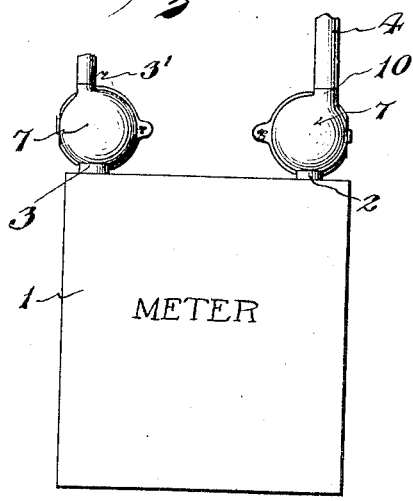
Figure 1 is a view showing the improved seals or casings applied to the pipes of a meter.
Figure 2:
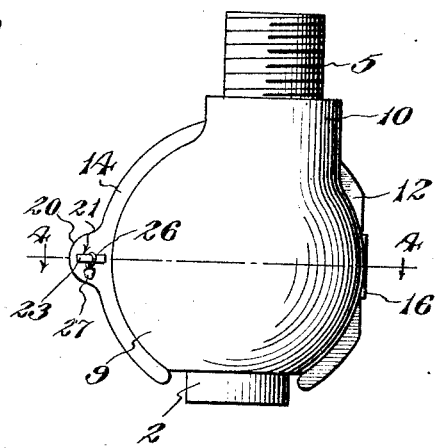
Fig. 2 is an enlarged view showing the improved protecting casing in side elevation.

In order to prevent the couplings from being released, I have provided protecting casings 7 which fit about the couplings and adjacent portions of the nipples 5 and pipes 2 and 3, as shown in Fig. 1. The casings are of a duplicate construction and each consists of a substantially spherical hollow body formed of cooperating side sections 8 and 9. These side sections are each of a cup-like formation and have their upper and lower portions recessed to provide a neck 10 through which the nipple 5 passes and an opening 11 to receive the pipe 2 or 3. The neck 10 is offset out of alinement with the opening 11 and, therefore, the pipe and nipple connected therewith may fit into the casing, as shown in Fig. 3, and when the casing is secured it will be impossible to release the coupling. Flanges 12 and 13 are provided along the margins of the two sections 8 and 9 at one side of the casing and similar flanges 14 and 15 are provided along the margins of the sections at the opposite side of the casing. It will thus be seen that the marginal edges of the two sections which contact when closed will be provided with wide bearing surfaces and they may have very good contacting engagement with each other. It should be noted that the flanges 12 and 13 have straight cut edges, as shown in Figs. 2 and 3, and, therefore, the two sections of the casing may be swung from this side into and out of a closed position without the flanges interfering with their movements.

Figure 4:
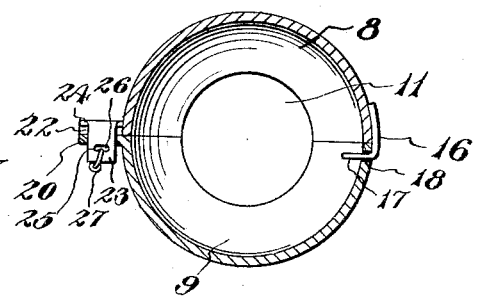
Fig. 4 is a transverse sectional view through the casing taken on the line 4—4 of Fig. 2 with the coupling and pipe sections connected thereby omitted.

In order to hingedly connect the two side sections of the casing and at the same time allow them to be taken apart when necessary, there has been provided a hinge tongue 16 which is riveted or otherwise rigidly secured to the section 8 and projects therefrom across the flat edges of the flanges 12 and 13, as shown in Fig. 4, with its free end portion 17 bent to extend inwardly through an opening 18 formed in the adjacent portion of the section 9. The free end portion of the hinge tongue fits loosely in the opening 18 and, therefore, the two sections of the casing may be swung toward and away from each other when the casing is to be disposed about or removed from the coupling. When the casing is removed from the coupling, the sections may be easily slid longitudinally of the free end portion of the hinged tongue and entirely separated from each other. It should also be noted that since the tongue extends inwardly it will overlie the flange 19 of the coupling 6 and thereby prevent the casing from being slid longitudinally out of shielding relation to the coupling by contacting with the flange.

The flange 14 of the casing section 9 is formed with a lip extension 20 having an opening 21 formed therein and the flange 15 of the casing section 8 is formed with a lip extension 22 which bears against the lip extension 20 when the casing is closed and is so shaped that it will be disposed at one side of the opening 21. This lip 20 carries a tongue or keeper 23, the base 24 of which is riveted or otherwise rigidly secured to the lip and the tongue is of such dimensions that it may pass through the opening 21 and project beyond the lip 20 when the casing is closed. An opening 25 is formed in the tongue or keeper, as shown in Fig. 4, to receive the wire 26 of a lead seal 27, and it will be readily understood that, when the casing is set in place and the wire 26 passed through the opening 25 and secured by its sealing lead 27, it will be impossible to remove the casing without breaking the sealing lead or its wire and thereby indicate that the casing has been tampered with. It will thus be seen that, when the casing is in place, it will very effectively prevent the coupling 6 from being released and, therefore, a pipe cannot be connected with the gas main and temporarily attached to the main supply pipe 3 of a house or other building. When it is necessary to remove the meter in order to inspect it or replace it with a new one, the casing can be very easily removed and replaced when a new meter has been substituted for one already in use. It will be understood that any seal which may be passed through the opening 25 may be substituted for the specific seal illustrated.

Having thus described the invention, I claim:

1. A coupling shield comprising companion side sections each of a cup-like formation and cooperating to form a hollow body adapted to fit about a coupling and pipe sections joined thereby, the body having openings in its upper and lower portions to receive the pipe sections, the said side sections having outstanding flanges along their margins between the openings abutting when the sections are closed, the flanges at one side having straight cut edges, a hinge tongue carried by one section at the last-mentioned side of the body and projecting therefrom to extend across the straight cut edges of the flanges and having its free end portion bent to extend inwardly through an opening in the adjacent side portion of the second section and hingedly connect the sections but allow the sections to be disconnected, and means to releasably retain the sections closed.

2. A coupling shield comprising companion side sections each of a cup-like formation and cooperating to form a hollow body adapted to fit about a coupling and pipe sections joined thereby, the body having openings in its upper and lower portions to receive the pipe sections, the said side sections having outstanding flanges along their margins between the openings abutting when the sections are closed, means hingedly connecting said sections at one side of the body, the flange of one section at the other side of the body having an opening formed therein, and a keeper carried by the corresponding flange of the other section and adapted to pass through the opening when the sections are closed and being formed with an opening to receive a fastener.

3. A coupling shield comprising companion side sections each of a cup-like formation and cooperating to form a hollow body adapted to fit about a coupling and pipe sections joined thereby, the body having openings in its upper and lower portions to receive the pipe sections, the said side sections having outstanding flanges along their margins between the openings abutting when the sections are closed, means hingedly connecting said sections at one side of the body, the flange of one section at the other side of the body being formed with a lip extension having an opening therein and the corresponding flange of the other section having a lip extension, and a keeper having a base secured to the last-mentioned lip extension and a tongue projecting therefrom and adapted to pass through the slot of the first lip extension when the sections are closed, said tongue having an opening therein to receive a fastener.

In testimony whereof I affix my signature.

RAMON SALBADOR [L. S.]